(12) United States Patent
Butz et al.

(10) Patent No.: US 9,102,834 B2
(45) Date of Patent: Aug. 11, 2015

(54) METHOD FOR PRODUCING AGGLOMERATES HAVING RUBBER AND WAX, AGGLOMERATES PRODUCED ACCORDING TO THE METHOD, AND USE OF THE AGGLOMERATES IN ASPHALT OR BITUMEN MASSES

(75) Inventors: Thorsten Butz, Buchholz (DE); Matthias Nölting, Hamburg (DE); Gunnar Winkelmann, Glinde (DE)

(73) Assignees: SASOL WAX GmBH, Hamburg (DE); STORIMPEX IM-UND EXPORT GmBH, Glinde (DE)

( * ) Notice: Subject to any disclaimer, the term of this patent is extended or adjusted under 35 U.S.C. 154(b) by 97 days.

(21) Appl. No.: 13/809,657

(22) PCT Filed: Jul. 10, 2011

(86) PCT No.: PCT/DE2011/001441
§ 371 (c)(1),
(2), (4) Date: Jan. 11, 2013

(87) PCT Pub. No.: WO2012/010150
PCT Pub. Date: Jan. 26, 2012

(65) Prior Publication Data
US 2013/0116364 A1 May 9, 2013

(30) Foreign Application Priority Data
Jul. 12, 2010 (DE) .......................... 10 2010 026 950

(51) Int. Cl.
*C08L 95/00* (2006.01)
*C08L 21/00* (2006.01)
*C08J 3/12* (2006.01)
*C08L 17/00* (2006.01)
*E01C 7/26* (2006.01)
*C08L 91/06* (2006.01)

(52) U.S. Cl.
CPC .. *C08L 95/00* (2013.01); *C08J 3/12* (2013.01); *C08J 3/128* (2013.01); *C08L 17/00* (2013.01); *C08L 21/00* (2013.01); *E01C 7/265* (2013.01); *C08J 2317/00* (2013.01); *C08J 2491/06* (2013.01); *C08L 91/06* (2013.01); *C08L 2555/22* (2013.01); *C08L 2555/52* (2013.01); *C08L 2555/72* (2013.01); *C08L 2555/86* (2013.01); *Y10T 428/2998* (2015.01)

(58) Field of Classification Search
CPC ............. C08L 95/00; C08L 21/00; C08J 3/12
USPC ..................................... 524/71, 571; 264/117
See application file for complete search history.

(56) References Cited

U.S. PATENT DOCUMENTS

| | | | | |
|---|---|---|---|---|
| 3,816,358 A | * | 6/1974 | Nordsiek et al. | 525/216 |
| 5,719,215 A | * | 2/1998 | Liang et al. | 524/62 |
| 2008/0216712 A1 | | 9/2008 | Bailey | |
| 2010/0056669 A1 | | 3/2010 | Bailey | |

FOREIGN PATENT DOCUMENTS

| | | |
|---|---|---|
| CA | 2152774 A1 | 7/1994 |
| CH | 694430 A5 | 1/2005 |
| DE | 2408690 A1 | 9/1974 |
| DE | 4232907 A1 | 3/1994 |
| DE | 4430819 C1 | 1/1996 |
| DE | 19601285 A1 | 7/1997 |
| DE | 60121318 T2 | 7/2007 |
| EP | 1873212 A1 | 1/2008 |
| FR | 2219176 A1 | 2/1974 |
| JP | 10338812 A | 12/1998 |
| JP | 2004060390 A | 2/2004 |
| JP | 2008050841 A | 3/2008 |
| WO | 9414896 A1 | 7/1994 |
| WO | 9726299 A1 | 7/1997 |
| WO | 2010023173 A1 | 3/2010 |

OTHER PUBLICATIONS

International Search Report for Application No. PCT/DE1011/001441 dated Nov. 11, 2011.

* cited by examiner

*Primary Examiner* — James J Seidleck
*Assistant Examiner* — Deve E Valdez
(74) *Attorney, Agent, or Firm* — Cohen & Hildebrand, PLLC

(57) ABSTRACT

A method for producing bulk good of agglomerates made of rubber particles and wax. A composition of the agglomerate and the use of the bulk good to produce asphalt or bitumen masses are created in that rubber is activated by swelling and using a swelling agent and a melt made of viscosity-reducing wax and of optional polyoctenamer is added, the activated rubber particles are agglomerated by means of the viscosity-reducing wax and optional adhesion-improving substances. The resulting larger volume leads to a viscosity reduction and the softening leads to a more intimate and more homogeneous wetting with the wax and, in the mixed good to be produced, a viscosity reduction remaining stable in the mixed good for <180 min and an increased stability of the cross-linking of the rubber molecules among each other after the agglomerates have been incorporated are achieved.

27 Claims, 3 Drawing Sheets

METHOD FOR PRODUCING AGGLOMERATES HAVING RUBBER AND WAX, AGGLOMERATES PRODUCED ACCORDING TO THE METHOD, AND USE OF THE AGGLOMERATES IN ASPHALT OR BITUMEN MASSES

This is an application filed under 35 USC §371 of PCT/DE 2011/001441, filed on Jul. 10, 2011 and claiming priority to DE 10 2010 026 950.6 filed on Jul. 12, 2010.

BACKGROUND OF THE INVENTION (1) Field of Invention

The invention relates to a method for producing a bulk material of agglomerates having rubber particles and wax, especially in the form of pellets. Furthermore the invention relates to the composition of agglomerate produced with this process, particularly in form of a pellet, and the use of this bulk material for the production of asphalt or of a mixed material with a bituminous material or of a bituminous material having improved properties.

(2) Description of Related Art Including Information Disclosed Under 37 CFR 1.97 and 1.98

It is well known that these asphalts can be modified with various additives to improve the performance and durability in road construction, for example, to prevent distortions such as ruts and to simultaneously prevent cracking from exposure to cold or mechanical fatigue. For example, elastomers (e.g. SBS and SBR), plastomers (e.g., EVA and PE) or rubber particles from tire recycling are used as additives. In addition, a second group of additives is in use, which are classified as waxes, e.g. Fischer-Tropsch paraffins, peat waxes and amide waxes. These additives also improve the resistance against deformation, but show only little or no improvement in fatigue and low temperature properties of the asphalt due to the lack of an elastic component. An important effect of the wax additives is the reduction of the viscosity of the bitumen and the asphalt mixture at the production and processing temperatures. This allows a simplification of the production of the asphalt mixture and the asphalt layers and a reduction of the production and processing temperature. This results in energy savings and reduced environmental impact.

Basically, the additives are homogeneously mixed into the binder bitumen before the asphalt is produced or are added directly during the production of the asphalts.

The modification with rubber occurs either in a wet process or in a dry process. In a wet process, approximately 5-20% rubber particles are introduced into hot (160-200° C.) bitumen and stirred for 1-4 hours. Only a small portion of the rubber goes into solution, while the rest swells by absorbing oil components of the bitumen. The resulting mixture remains homogeneous and requires continuous stirring until the asphalt is produced to prevent the rubber particles from settling. The viscosity of the bitumen is greatly increased by the rubber and changes with storage time due to swelling and depolymerization processes, as described by Diedrich in his article "The use of modified scrap rubber powder in North American road surfaces", Asphalt 5/2000, 6-10.

In the dry process, the rubber particles are added directly into the asphalt mixer and mixed with bitumen and minerals. Disadvantageously, the mixing time must be increased for attaining a homogeneous distribution. Even when the mixing time is increased, the time for interaction with the bitumen is too short to achieve swelling and dissolution comparable with the wet process. There is a risk that the desired thick binder films and a high bonding strength of the binder cannot be achieved. Therefore, the quality of the rubber-modified asphalt produced with the dry process is generally lower.

To avoid the disadvantages of the dry process, a master batch can also be produced from rubber particles and bitumen, which is produced in granular form, as realized, for example, in the so-called Tecroad product.

Specifically, experts have repeatedly tried to suggest improvements in the use of rubber for asphalts.

It is known from EP 1 873 212 B1 to modify rubber powder by swelling with 2-40% aromatic oils and to subsequently modify bitumen in a wet process, wherein the pre-swelling reduces the temperature and the mixing time in the bitumen modification. Disadvantageously, however,

- the swollen rubber powders are not necessarily viscosity-reducing,
- the resistance against deformation is reduced at ambient temperatures,
- there is no compatibility of rubber and bitumen,
- aromatic oils that are harmful to health and the environment are used,
- the product is in a form that cannot be easily and safely stored, transported and dispensed with systems that typically exist in asphalt mixing plants (pneumatic conveying, screw conveying),
- the product is unsuitable for direct addition into the asphalt mixer which increases the complexity (time, energy, investment for a modifying plant) for the previous bitumen modification, and
- due to the risk of dust explosions, such additives can only be delivered in this way as a fine powder by complying with costly requirements.

Furthermore, a granulate including rubber, a process for its production, and process for producing an asphalt mixture using the granulate are known from WO/1997/026299 and DE 196 01 285 A1.

Accordingly, a free-flowing granulate of 50-95% rubber and bitumen or polymer plastic (thermoplastic elastomers or plastomers) is described, whose constituents are evenly distributed at temperatures >130° C. under exposure to shear forces. Up to 25% additives may be present (sulfur, vulcanization accelerators, heavy oil, fatty acids, cellulose fibers). The granulate may be prepared from a mass that is homogenized or chemically combined at a high temperature in a kneader or by pressing the individual components at a low temperature (edge mill, orifice plate). This allows the manufacture of rubber asphalt mixture for road surfaces by adding the granulate in the asphalt mixing process to the minerals or to the bitumen.

The disadvantages which operate against a reduction of the viscosity and allow emissions and deformations are here also overwhelming. In addition, oily constituents may be removed from the bitumen, which may cause hardening of the bitumen.

When the skilled person proceeds according to the method for the production of hydrated lime pellets for use in asphalt production and/or soil conditioning by pelleting the hydrated lime and a binder (at 0.5 to 69%) according to the U.S. 2008/0216712 A1, he would notice that hydrated lime improves the water resistance of asphalt and the adhesion of the binder to the minerals and that rubber and wax in this paper act as a binder.

The binder may here be water-based or hydrophobic and may include at least one of the following components: bitumen, plastomers, elastomers, rubber, ground tire rubber, pre-reacted ground tire rubber. The pellet may contain up to 30% of an additive (aliphatic mineral oil distillate, plastomers, elastomers, rubber, pre-reacted rubber tires). It may also contain as an additional component: rheology modifiers, structural additives, solvents, dyes.

Oils and waxes are mentioned as suitable organic binders for the pellet, and the pellet may in one embodiment be made of a core of hydrated lime and a shell composed of the binder, wherein the shell may in turn be made of bitumen and high-temperature waxes.

The expert finds no evidence in this analysis that would lead to a reduced viscosity and an improved resistance against deformation. Instead, he must conclude that oily constituents can here also disadvantageously be removed from the bitumen.

Furthermore, WO 94/14896 and CA 2,152,774 disclose a method for preparing a bituminous composition. Rubber particles from scrap tires are here swollen by heating and shearing in a highly aromatic hydrocarbon oil and at least partially depolymerized. This material is dispersed in bitumen and a compatibilizer (liquid rubber), and, if necessary, a crosslinking agent may be added in order to obtain a storage-stable binder. So-called masterbatches with 25-80% dispersed, stabilized rubber in bitumen are produced, which is formed into a pellet with fillers and polymers.

No advantages for a reliable compaction, energy savings, reduced emissions and resistance against deformation can be found. Disadvantageously, aromatic oils which are harmful to health/environment are even used.

The patent DE 601 21 318 T2 relates to a method for producing a granular rubber material and its use in bitumen, and discloses the production of rubber granules, e.g. from scrap tires, and a thermal adhesive (polyolefins, PE, PP, EVA) with optional addition of fibers in an extrusion process. The heat generated by friction of 80-300° C. is intended to melt the hot melt glue.

Polyolefins cause an increase in the viscosity of asphalt. There is still a risk that oily components are removed from the bitumen, causing hardening of the bitumen.

In a process for preparing bituminous mix disclosed in the patent DE 44 30 819 C1, in particular road asphalt, with the addition of rubber and activated carbon, the activated carbon reduces vapor/gaseous emissions in the production of hot asphalt and elution of harmful substances due to water in cold asphalt produced with tar-containing recycled asphalt. Rubber is here added to the hot mineral prior to the bitumen together with or separately from the activated carbon or previously mixed with the bitumen. However, viscosity-reducing effects and an increased resistance against deformation are not taught.

In a mastic asphalt according to CH 694 430 A5, through addition of rubber granulate, preferably from scrap tires, the lower density of the rubber granulate in comparison to the mastic asphalt is surmised to cause an accumulation on the surface of the asphalt layer in order to produce a more elastic surface, noise abatement, improved antiskid properties. The expert repeatedly fails to find suggestions for reducing the viscosity, increasing the resistance against deformation, simplifying storage and transport, improving dispensing and preventing hardening of the bitumen.

The following publications also fail to disclose aspects that would obviate the previously analyzed disadvantages:

JP 2004060390 A discloses an asphalt with a 2-component epoxy resin, wherein the main component of the epoxy resin is added to the asphalt mixture and the hardener is incorporated in the form of a swelling agent absorbed in rubber particles, JP 2008050841 A, wherein a lattice bottom plate protects the "paved surface" and reduces noise and improves the grip and wherein the plate is produced from scrap rubber tires and polyethylene, JP 10338812 A with a water-swellable composition and "water stop material" consisting of water-swellable clay, bitumen, temperature-sensitive enhancers, including rubber and reinforcing fillers DE 42 32 907 A1 discloses water-swellable products, which are however resistant against water and many chemicals for the manufacture of seals with solid or cellular structure, wherein a bitumen emulsion is also used as a reactant in lieu of water for modifying the product properties and wherein e.g. rubber powder can be added as an inexpensive filler; however, there is no reference to asphalt, and DE 24 08 690 C2 discloses thermoplastic materials produced by mixing rubber material pieces, for example from scrap tires, and a thermoplastic binders, such as PE, EVA, SBS.

Lastly, the U.S. 2010/0056669 A1 discloses producing a storage-stable pellet for asphalt production, which is composed of a core composed of 15-30% ground tire rubber and 70-85% road construction bitumen, and a shell coating the core, so that the pellet has a maximum size of $1/16$ to 2 inches, composed of a water-resistant polymer or wax, or fine particles.

The aforementioned core contains less than 10 wt.-% sulfur; the fine particles are hydrated lime (or ground asphalt [Claim 4]) making up less than 40 wt.-% of the whole pellet.

The pellet may also contain rock powder, additional bituminous binders, non-bituminous binders, structural additives, dyes, salts, viscosity modifiers.

Materials with non-Newtonian behavior are mentioned, e.g. polysaccharides. It can thus be concluded that this does not include viscosity reducers.

The process for preparing these pellets includes procurement of ground tire rubber and road construction bitumen, reacting rubber and bitumen for at least 45 minutes, combining the reaction mixture with fine particles to form the core, and coating the core with a shell to form the pellet.

The method for producing asphalt includes the liquefaction of the pellets by heating and combining with minerals, and optionally the addition of additional bitumen.

The material for the so-called shell is supposed to include, inter alia, crude oil wax, Sasol Wax and Sasobit, and also Sasol Wax as a component of the binder for the so-called core beside bitumen and rubber, because Sasol Wax is known to be useful for reducing the temperatures for the preparation and discharge of asphalt from about 325-300° F. (162-150° C.) to 280-250° F. (139-121° C.).

The above-mentioned reactions of rubber- and bitumen should be performed at high temperatures of 350-380° F. (about 175-195° C.).

A skilled artisan will deduce from U.S. 2010/0056669 A1 that already a pre-reaction of the rubber can occur (by mixing with hot bitumen), and the addition of wax to reduce the temperatures for producing and applying asphalt has proven successful.

After thorough analytical investigation, however, the skilled artisan will recognize that these so-called pellets do not represent an additive for modifying asphalt into rubber asphalt, but rather a kind of binder for producing pelleted asphalt which represents the binder of the asphalt exclusively or with limited additional fractions of bitumen, which leads to disadvantages. Current storage systems, conveyor systems and metering systems of asphalt mixing plants are not constructed for the use of a solid, granular binder.

The skilled artisan expert may infer herefrom a teaching of bitumen hardening, but not in conjunction with integrated swelling.

Even when also consulting the WO 2010/023173 A1, no approaches for solving the following task are found in the combination of the analyzed prior art sources.

The last-mentioned publication discloses a bituminous composition of a "wet process". Disadvantageously, a rubber-modified finished binder is used, and the user at the asphalt mixing plant needs an additional binder tank for storage, which is usually not available. There is also a lack in flexibility for adjustment, since only one binder with a defined rubber concentration and a defined hardness class is contained in the tank. As a further disadvantage, time, energy and a modification facility are required for the production of the bituminous composition. Moreover, the swelling of the rubber does not prevented hardening of the bitumen by removing oily components from the bitumen. The viscosity of the bituminous composition remains the same as in a conventional rubber-modified bitumen, and is not reduced.

BRIEF SUMMARY OF THE INVENTION

It is the object of the invention to provide a method for producing a bulk material of agglomerates from rubber particles and wax, especially in the form of pellets, as well as a novel composition of the agglomerate, particularly in a pellet, and use of this bulk material for the manufacture of asphalt and of the improved asphalt or of a mixed material with a bituminous material or of a bituminous material, wherein the rubber particles are combined with the wax such that the rubber particles are activated without substances hazardous to health/environment and are homogeneously wetted with wax, the agglomerate like the pellets can be stored and transported easily and safely, and can be dispensed with the systems that are usually present in the asphalt mixing plants for the direct addition, the manufactured asphalt has such combined function effects, which increase its resistance against deformation at ambient temperature and improve the asphalt due to the properties of the activated rubber particles and their intensive interaction with the bitumen, wherein oily constituents are not removed from the bitumen in the asphalt and the bitumen does not harden, and the beneficial effects in the agglomerate result in a logistically more flexible incorporation or processing the asphalt or of a mixed material with a bituminous material or of a bituminous material.

In this way, in particular the disadvantages described in the U.S. 2010/0056669 A1 are eliminated, so that reduced hardening of the bitumen by incorporating bitumen components during the swelling of the rubber does not take place, swelling of the rubber by added oil (but implicitly by the added bitumen) cannot take place, the resistance against deformation due to wax is not improved, an optional addition of polyoctenamer to improve the compatibility of bitumen and rubber does not take place, and only a small fraction of maximal 30% rubber is possible.

As part of the technological chain, such as the agglomerate production, the agglomerate composition and the production of the improved asphalt, benefits for the processing and reliable compaction, energy savings, reduction of emissions should be attained, dust explosions avoided and pneumatic or mechanical conveying (screw conveyor) can be realized in order to reduce complexity, such as time, energy, investments for modification facilities compared to conventional bitumen modification.

This complex object is attained by the features of the appended claims.

The method recited in claim 1 for the preparation of a bulk material of agglomerates that include rubber particles and wax with a solidification point above 50° C., preferably mineral oil paraffins, Fischer-Tropsch paraffins, amide waxes, peat waxes, polymer waxes, esters of glycerol, by swelling pre-reaction of the rubber particles and addition of wax, uses at least one screen fraction of rubber particles mechanically generated in accordance with the claims 2 to 3, and includes the method steps of a) activation of the rubber by swelling and by using a swelling agent from naphthenic or paraffinic mineral oils, recycled lubricating oils, natural oils or low-melting paraffins from the Fischer-Tropsch synthesis, b) coating of the rubber particles activated by swelling with a melt of viscosity-reducing wax and optional polyoctenamer, c) agglomeration of the rubber particles activated by swelling with the viscosity-reducing wax and optional adhesion-enhancing materials such as resins or polyisobutenes by a blending or mixing action or by application of pressure such that the swelling agent penetrates into the interstices of the rubber molecules and urges the molecules apart, the attractive physical forces are reduced or interrupted, so that the resulting larger volume causes a reduction in viscosity and the softening causes a more intimate and homogeneous wetting with the wax, wherein d) as a surprising and inventive combined effect in the agglomerate due to the greater volume leading to a reduction of the viscosity and due to the softening, a more intimate and homogeneous wetting with the wax and an increased stability of cross-linking of the rubber molecules with one another are produced, wherein this effect is the basis of, or the potential for, the advantageous effects in the asphalt to be produced, in a mixed material with a bitumen compound, or in a bitumen compound.

According to the method, by adding wax, a layer is formed on the rubber items activated by swelling.

The method is further improved by adding 1-50 wt.-%, preferably 25-35 wt.-% of the melt of the wax relative the rubber fraction.

Addition of polyoctenamer with a fraction of 1-50 wt.-% in the wax melt, preferably with a fraction of 25-35 wt.-% in the wax melt, is also advantageous.

Moreover, it is useful to further add 0.1-5 wt.-% of adhesion-enhancing materials, for example resins or polyisobutenes, to intensify agglomeration.

The wax melt should be added to the rubber particles to be activated by swelling within about 2-3 minutes.

A mixing and blending, particularly to a pellet, can occur by a heated mechanical mixer, extrusion with an edge mill and a shaping die, extrusion, or a heat-generating mixer as friction mixers, fluid mixers or turbo mixers.

The addition of wax to the rubber particles and the formation of agglomerates are possible in two successive process steps.

The agglomerate produced by the method is used in the preparation of asphalts or bitumen compounds through direct addition in a mixing plant for mixed asphalt materials or bituminous materials, particularly in the form of a pellet made of rubber particles and wax, and includes:

rubber particles having a particle size distribution of between 0.05 and 5 mm, a melt applied into or onto the rubber particles from wax having a fraction of 1-50 wt.-% based on the rubber component, and an absorbed swelling agent in the rubber particles in a range of 1% to 100% of the maximum absorbable amount of the swelling agent.

The agglomerate is advantageously prepared within 15 minutes as a bulk material with a dry surface by mixing or agglomerating processes.

For the preparation of asphalt, a bulk material by mixing with hot bitumen is used, wherein for reducing the temperatures for the preparation and application of the asphalt, the agglomerates are added directly in the asphalt mixer during or after the addition of the bitumen with a fraction of 1-30 wt.-%, preferably with a fraction of 5-20 wt.-% based on the bitumen fraction.

The technological usage is rounded out by a method, in which
a) the addition occurs 3 to 15 seconds prior to the addition of the bitumen,
b) a rapid disintegration of the agglomerates, a pre-distribution of rubber particles and a thermal activation of the rubber are performed within this period due to the higher temperature and the high shear forces,
c) in the mixing process of the asphalt, the heat liquefies the wax, thereby quickly releasing the activated rubber particles,
d) the rubber particles activated by pre-swelling produce an intensive interaction, such as enveloping with the bitumen, and/or,
e) the mixing temperature is in the range of 130 to 190° C.

With a mixed asphalt material or a mixed material with a bitumen compound, the method is rounded out by
f) an introduction temperature of 120 to 230° C.,
g) a degree of compaction in a range from 98 to 103%,
h) a tensile splitting strength in a range from 1.70 to 3.00 N/mm$^2$,
i) a tensile splitting strength after immersion in water in a range from 1.5 to 2.5 N/mm$^2$, and
j) a resistance against deformations, measured as an elongation rate in a uniaxial compression test in a range from 0.6 to $0.9*10^{-4}$/n ‰.

The process for the production of asphalt or a mixed material with a bituminous material or a bituminous material by using a bulk material from the produced agglomerates is determined so that the swelling agent penetrates into the interstices of the rubber molecules during mixing, urges the molecules apart and reduces or interrupts the physical attractive forces, wherein reduction of the viscosity is produced that is stable in the mixed material for up to 180 min and wherein during the reduction of the viscosity effective over this time an increased stability of the cross-linking of the rubber molecules with each other after incorporating the agglomerates, accompanied by a stability of such a formulation lasting up to 180 min, is obtained.

Thus, the asphalt mix or the mixed material with bituminous composition or the bituminous composition may exhibit a reduction in the viscosity of the bituminous composition relative to its initial viscosity due to the interaction with both the swelling material and the wax, with the reduction in the viscosity being stable for up to <180 min in the mixed material, as well as increased stability of the cross-linking of the rubber molecules and stability.

Such bituminous compositions with agglomerates may also be used for a surface treatment of traffic routes by spraying the bituminous compositions and applying minerals.

The rubber particles may be obtained from processing scrap tires (car, truck, or parts of tires) at ambient temperature, because rubber particles produced in the cold exhibit unfavorably low surface/volume ratios.

The rubber particles may therefore swell with 5-100 wt.-%, preferably 10-40 wt.-% based on the rubber fraction with naphthenic mineral oils, paraffinic mineral oils, recycled lubricating oils, natural oils, fatty acids, or paraffins melting at 20-40° C. from the Fischer-Tropsch synthesis, and then provided, based on the rubber fraction, with 1-50 wt.-%, preferably 10-30 wt.-% of a melt made of wax, including an optional addition of polyoctenamer, and agglomerated.

The fraction of the optional polyoctenamers in the wax melt is 1-50 wt.-%, preferably 25-35 wt.-%. Here, the wax melt serves as a binder for the rubber particles.

Optionally, the agglomeration may be intensified through addition of 0.1-5 wt.-% adhesion-enhancing substances, such as resins or polyisobutenes.

All waxes melting above 50° C. such as paraffin oil, Fischer-Tropsch paraffins, amide waxes, peat waxes, polymer waxes or esters of glycerol can be used as waxes.

For example, all naphthenic oils used in the rubber industry or common in other applications are suitable as naphthenic mineral oils, which are produced by vacuum distillation from suitable crude oil and without or with subsequent refining.

All refined or non-refined paraffinic distillation fractions obtained from suitable crude oils by vacuum distillation can be used as paraffinic mineral oils.

Also suitable are mineral oils, which are recycled from used lubricating oils.

All natural, recycled or chemically altered, e.g. refined or transesterified esters of glycerol with fatty acids are suitable as natural oils.

The paraffins melting at 20-40° C. are characterized by a fraction of linear alkenes between 60 and 90% and a density of 700-800 kg/m$^3$ at 70° C., as measured by chromatography, and are obtained from the raw product of the Fischer-Tropsch synthesis by distillation.

For example, synthetic aliphatic, aromatic or partly aromatic hydrocarbon resins, or resin esters and polyterpenes derived from tree resins (Rosin) can be used as adhesion-promoting resins.

The invention has the overall effect that the swelling agent penetrates into the interstices of the rubber molecules and urges the molecules apart, whereas the chemical cross-linking sites between the polymer chains remain unchanged. The physical forces of attraction are then reduced or interrupted. The resulting larger volume and the softening causes more intimate and homogeneous wetting by the wax.

After the wax is melted in the asphalt mixer, the bitumen can make more intensive contact with the swollen structure of the rubber molecules, without requiring large amounts of oily components of the bitumen for the swelling. Change or hardening of the bitumen by removing the oily components is thereby reduced.

The molten wax reduces the viscosity of the bitumen in hot asphalt mix and therefore allows reliable compaction of the asphalt and reduction of the temperatures for producing and installing the asphalt. After the asphalt has cooled, the wax solidifies, thus improving the resistance of the asphalt against deformations due to its hardness. The optional polyoctenamer forms bonds during the asphalt production which increase the compatibility of the rubber and asphalt.

Unlike fine rubber particles, the agglomerates produced according to the invention can are readily conveyed with the dispensing techniques existing in asphalt mixing plants, such as with screw conveyors or pneumatic conveyors, which are also used for fiber pellets. Dealing with dust-free agglomerates thus also reduces the risk of dust explosions.

The agglomerates are metered directly into the asphalt mixer in the production of asphalt, based on the bituminous composition with a fraction of 1-30 wt.-%, preferably 5-20 wt.-%.

The agglomerates can be added to the hot mineral substances before, during or after the addition of the bitumen.

Preferred is the addition within a few seconds before the bitumen is added, because the higher temperature at this time and the strong shearing forces cause a rapid disintegration of the agglomerates, a pre-distribution of the rubber particles as well as thermal activation of the rubber.

In the asphalt mixing process, the heat liquefies the wax as well as the optional adhesion-enhancing substances and quickly releases the activated rubber particles. The activation by pre-swelling causes a more rapid and more intensive interaction with bitumen, so that better asphalt properties are achieved than with the conventional addition of rubber particles in a dry mixing process.

With the optional polyoctenamer as a reactive polymer, the compatibility of bitumen and rubber is improved through the formation of chemical bonds. The molten wax reduces the increased viscosity of the asphalt mixture due to the rubber, so that the produced asphalt layers with asphalt finishers can be better processed and the required degree of compaction during compression by rolling is reliably achieved.

In contrast to the viscosity reducers that are liquid at ambient temperature, the wax used herein does not cause softening at ambient temperature, but rather increases the strength.

The reduction in the viscosity allows a reduction of the typically high temperatures necessary with rubber particles in the production of the asphalt mix and the asphalt layer. This saves heating energy, and the reduction of emissions of $CO_2$ and bitumen vapors and aerosols protects the environment and improves workplace safety.

An additional positive effect on the environment is the high-value reuse of scrap tires in the context of the Recycling and Waste Management Act. To date, much of the accumulating scrap tires were utilized only with a low recovery of energy.

Moreover, polymers for producing polymer modified binders are conserved, because they are replaced with the inventive rubber asphalt.

The use of natural oils or recycled lubricating oils as swelling agents also conserves the limited crude oil resources.

The invention provides technologically surprising and beneficial effects, starting with the production of the agglomerate from activated rubber and wax to the use for asphalts or bituminous compounds or additional applications, which could only be discovered successfully by the following complex considerations with the following results:

1. The composition of bitumen is generally described using a colloidal model. Accordingly, it consists of submicroscopic small solid particles (colloids), called asphaltenes, and a surrounding liquid (oil-like) phase of a dispersion agent, called maltenes. This system is permanently stable because the maltenes stabilize the asphaltenes. The mechanical properties of bitumen are determined by the following factors:
   fraction of the asphaltene phase,
   viscosity of maltene phase.
The volume fraction of the asphaltene phase increases with decreasing temperature. I.e., molecules change from the maltene phase into the asphaltene phase at low temperatures. With increasing temperatures, molecules change back from the asphaltene phase to the maltene phase.
This model explains the increased hardness and stiffness of bitumen at low temperatures due to the growth of the solid asphaltene phase.
By the swelling of rubber particles in the bitumen, oily components (maltenes) are removed from the bitumen and fixed in the rubber. The rubber particles thereby increase in volume (up to twice) and become softer. The effect on the bitumen is similar as during cooling: The fraction of the solid asphaltene phase increases and the bitumen hardens.
The more complete the swelling of the rubber is already preempted by the addition of swelling agents, the lower is the uptake of components from the bitumen and the less is the modification of the properties of the bitumen. The flexibility and thus the favorable low-temperature properties of the bitumen remain largely intact.
2. The attained virtual "blocking action" of the oil in the rubber could be discovered, because in accordance with the invention, the rubber granulate is pre-swollen with a swelling agent. This swelling anticipates a process using the wet process of the prior art method. According to the invention, the rubber granulate is hereby incorporated in hot, often still specifically heated, bitumen. During a so-called "maturation period", low molecular weight components migrate from the hot bitumen into the rubber granulate and swell this granulate, i.e. parts of the oily phase (maltenes) of the bitumen migrate into the rubber.
Maltene-deficient bitumen is less flexible and therefore brittle and less resistant against cold temperatures.
Pre-swelling according to the invention now causes a reduction in the absorption capacity of the rubber in advance of the asphalt production. This at least partially reduces the removal of the oils from the bitumen in the hot phase during mixing and transport, thus ensuring that the resulting bitumen mixture retains its original characteristics.
It can thus be assumed that harder bitumen types can now be used in the context with rubber modification in a more targeted fashion, because an "action effect" for the removal of the oils in the wet process can be better controlled and managed.
According to the invention, the swelling agent can act as a manipulated variable for the bitumen properties or may even be used as follows:
Depending on the available bitumen and/or the quality of the reclaimed asphalt employed in the asphalt formulation, the quality of the resulting bitumen fraction contained in an asphalt mixture can be influenced and controlled via this manipulated variable.
A technological final stage of the invention is the addition of the inventively prepared agglomerate in a mixing plant for asphalt; however, the invention can also be used with special binders. The agglomerate also causes very positive effects when used in place of untreated rubber powder in a wet process. Both the swelling agent and the wax components improve the viscosity. This effect can be used to increase the production efficiency in this process, either by increasing the throughput rate or by significantly reducing the energy consumption.

Furthermore, advantages are also attained in applications where rubber-modified bitumen is used in surface treatments for roads. The bitumen is here applied to a surface by hot-spraying. In a following process step, the aggregates are then distributed over the hot surface and rolled.

The improved viscosity proves again advantageous for the spraying process. Likewise, the process is significantly improved due to the above-mentioned more targeted possibility for formulating the bitumen.

The swollen rubber particles incorporated in the asphalt matrix remain highly elastic when the asphalt has cooled. Since maltene phases are not expected to precipitate in the rubber even over long storage periods, the improved elastic behavior at low temperatures can be used to employ harder binders for the asphalt production. It is thus possible to develop asphalt formulations with a much longer storage time. Economic production of asphalt mix is currently only possible when reusing of reclaimed asphalt. Since reclaimed asphalts typically lack elastomer-modified binders, compensation with the addition of fresh bitumen is necessary. For this purpose, so-called RC (recycling) variants have been developed with polymer-modified bitumens, which are suitable for reuse of up to 20 M % asphalt. When the use of higher asphalt fractions is desired, another binder with a higher fraction of incorporated polymer components must be selected. Usually, only two options are available per type, namely up to 20% added RC and up to 50% reclaimed asphalt. When, for example, 30% RC is used, the variant with up to 50% must necessarily be selected. This increases the costs, because higher modified bitumen types are more expensive. Suitable binders for over 50% added RC are not yet available. In the future, particularly high economic efficiencies will become possible with new processing techniques.

With the technological implementation of the invention, it is possible to match the required rubber fraction exactly to the respective production process in each mixing plant, i.e. each mixture contains—as illustrated previously with the adjustment effect—the exact modifying quantity of rubber granulate. Additionally, container space and energy can be saved at each mixing plant.

Noteworthy are the properties of the finished mix, because the previously tested asphalt mixes required high-quality receiving facilities for container terminals and roads suitable for heavy use. For example, stone mastics (SMA) are distinguished by very good stability and high wear resistance. Typically, polymer-modified binders are used for this purpose. The results of the evaluation of the prior art have shown that with conventional use there are no significant differences between rubber-modified and polymer-modified mixture types. Regarding the durability, as measured by the rutting test, significant benefits are seen in the rutting test when using the agglomerate according to the invention.

The preparation of the agglomerate can therefore in practice substantially include the following steps:

Step 1: Obtaining a screen fraction of rubber particles having a particle size distribution of between 0.05 and 5 mm, preferably 0.2-1.2 mm, which are obtained at ambient temperature by mechanical processes from scrap tires, wherein impurities and steel fibers and fabric fibers are separated by magnetic and mechanical processes.

Step 2: The activation of the rubber by swelling using suitable liquids, such as the naphthenic oils now introduced in the rubber industry in lieu of the use of highly aromatic oils, wherein it has been surprisingly discovered that even natural oils, such as vegetable oil, paraffinic oils, recycled lubricating oils and paraffins melting at about 20-40° C., which are obtained as a distillation fraction of the product stream of the Fischer-Tropsch synthesis, are suitable to produce swelling.

A preferred embodiment of the swelling involves the addition of less than the maximum absorbable amount of swelling agents under mechanical agitation, which ensures the homogeneous distribution of the swelling agent.

Step 3: With the addition of wax, the rubber particles activated by swelling are in fact coated with viscosity-reducing wax additive, optional polyoctenamer and optional adhesion-enhancing substances and thus a production of agglomerates from these components, thereby resulting in the uniform distribution of the viscosity-lowering wax on the rubber according to the present invention. All continuous or batch processes are suitable for this purpose, which mix a wax/polyoctenarner adhesion-enhancing melt with the preheated rubber particles. Particularly suitable are, for example, mixers which swirl the rubber particles with rotating internal structures or mixing arms and which attain a uniform distribution of the wax through repeated contact of the swirled particles. Alternatively, the wax and optionally the polyoctenamer and optional the adhesion promoter can also be supplied to mixers in solid form by controlling process heat. A preferred embodiment is the application of friction mixers, such as fluid or turbo mixers. Such mixers generate the necessary heat by friction and shear forces. After providing the rubber particles and start of the mixing process, the swelling agent, the wax, the optional adhesion-enhancing polyoctenamer and optional materials may be added in any order or simultaneously. The components can be added, the wax can be homogeneously mixed and melted in one operation. The optional polyoctenamer enhances the compatibility between rubber and bitumen through chemical cross-linking.

Particularly suitable for the coating of the rubber particles are all methods, which in addition to the distribution of the wax melt agglomerate at the same time the particles to form larger aggregates of 1-40 mm in diameter. Here, the wax polyoctenamer melt acts as a binder for the rubber particles. The optional addition of adhesion-enhancing substances may enhance agglomeration. This can include the following methods commonly used in plastics processing and other areas:

extrusion with edge mill and shaping die,
extrusion.

Alternative step: The separate production of agglomerates.

The addition of wax to the rubber particles according to the invention and the formation of agglomerates with the aforesescribed process steps may also take place in two consecutive process steps, whereby here the optional polyoctenamer improves the compatibility of rubber and bitumen through chemical cross-linking.

The composition of the agglomerate is characterized by rubber particles having a diameter of 0.05-5 mm swelling at room temperature or at elevated temperature above the melting point of the swelling agent, absorbed naphthenic oil or paraffinic oil or recycled lubricating oil or natural oil, or Fischer-Tropsch paraffin melting at 20-40° C. The fraction of the swelling agent may reach the same mass of the rubber particles a fraction of 1-50 wt.-%, based on the rubber particles, of a wax with a solidification point above 50° C.

a fraction of 0.1-10 wt.-%, based on the rubber particles, of the polyoctenamer polymer wax (Vestenamer®)

a fraction of 0.1-5% adhesion-enhancing substances, such as resins or polyisobutenes The quantitative and qualitative attainable values of the properties in the asphalt are improved with the following features in the manufacture of the asphalt and in the installed asphalt:

the agglomerates are dispersed directly into conventional asphalt mixers during production of asphalt with a fraction of 1-30 wt.-%, preferably 5-20 wt.-%, based on the bitumen mass, the agglomerates are added to the hot mineral substances before, during or after the addition of the bitumen, wherein it has been proven effective when the agglomerates are added several seconds before the bitumen is added, because the higher temperature at this time and the high shear forces in the asphalt mixer cause rapid disintegration of the agglomerates, pre-distribution of the rubber particles as well as thermal activation of the rubber, the heat then instantaneously liquefies the wax in the asphalt mixing process and rapidly releases the activated rubber particles, wherein the activation by pre-swelling causes accelerated and intensive interaction with bitumen, so that better asphalt properties are attained compared to a dry addition of rubber particles.

the swollen pellets introduce an additional wax component which reduces the viscosity, is advantageous for processing, intentional compaction, saves energy and reduces emissions and increases the resistance of the asphalt against deformation at ambient temperature, the asphalt properties are improved with the rubber particles activated by swelling and through intensive interaction with the bitumen, swelling before agglomeration prevents removal of the oily constituents from the bitumen in the asphalt when the rubber swells, thus countering hardening of the bitumen.

Exemplary embodiments of the invention will now be described, first based on tables, and then with reference to experiments documented in FIGS. 1 to 3.

BRIEF DESCRIPTION OF THE DRAWINGS

The figures show in

FIG. 1 a diagram as a function of time of the viscosity of the modified bitumens of the modification process, with the variants 1) 20 wt.-% rubber particles, 2 wt.-% aromatic oil 2) 19.1 wt.-% rubber particles, 0.9 wt.-% polyoctenamer (Vestenamer®), 2 wt.-% aromatic oil 3) 22 wt.-% activated bulk material composed of 9/10 rubber particles and 1/10 low-melting wax from the Fischer-Tropsch synthesis 4) 22 wt.-% of activated bulk material of 9/10 rubber particles and 1/10 mineral oil 5) 22 wt.-% activated bulk material from 4/6 rubber particles, 1/6 mineral oil and 1/6 FT wax with solidification point 102° C. (Sasobit®)

Figure 1:
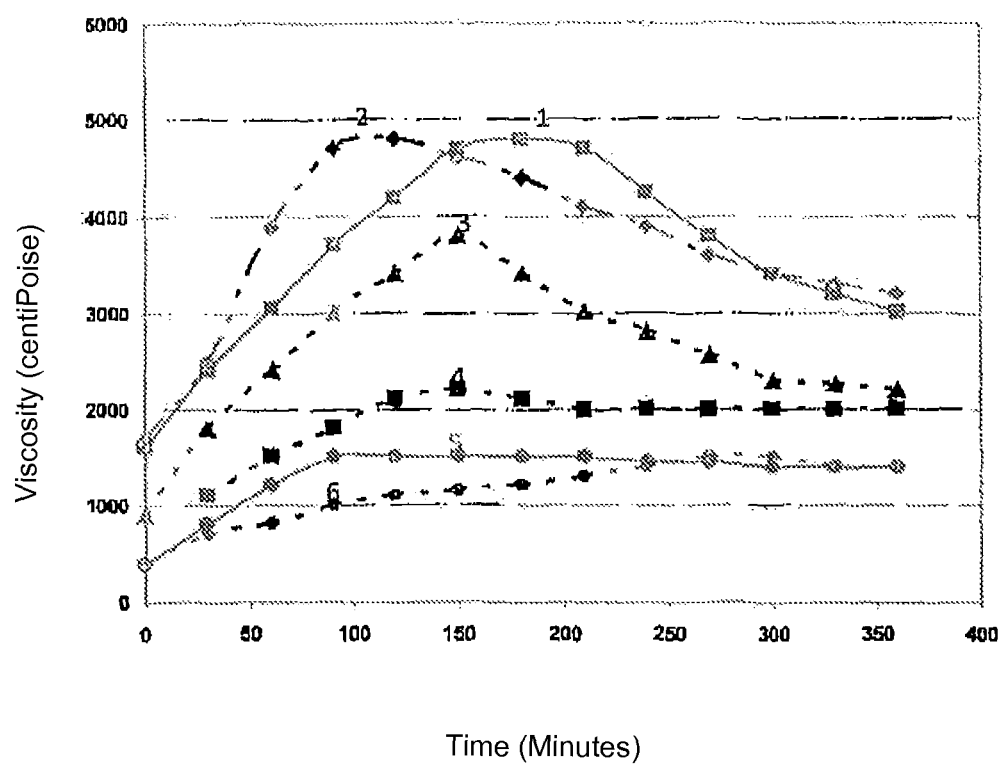

6) 22 wt.-% activated bulk of 4/6 Rubber particles, 1/6 low melting wax from the FT synthesis and 1/6 FT wax (Sasobit®);

FIG. 2 a diagram as a function of time of the softening point by ring and ball (measured according to DIN EN 1427) of tire-rubber-modified bitumen produced by stirring at 180° C.; 78 wt.-% base bitumen B 80/100 with the variants shown in FIG. 1, 1) 20 wt.-% rubber particles, 2 wt.-% aromatic oil 2) 19.1 wt.-% rubber particles, 0.9 wt.-% polyoctenamer (Vestenamer®), 2 wt.-% aromatic oil 3) 22 wt.-% activated bulk of 9/10 rubber particles and 1/10 low-melting wax from the Fischer-Tropsch synthesis 4) 22 wt.-% of activated bulk material of 9/10 rubber particles and 1/10 mineral oil 5) 22 wt.-% activated bulk material from 4/6 rubber particles, 1/6 mineral oil and 1/6 FT wax with solidification point 102° C. (Sasobit®)

Figure 2:
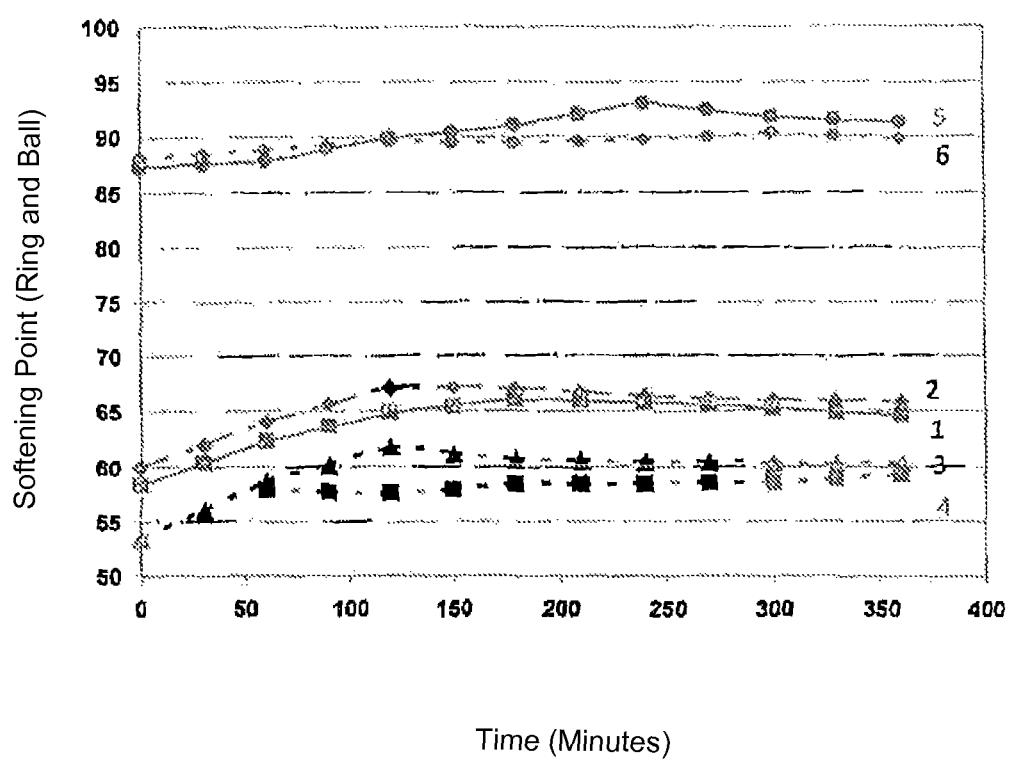

6) 22 wt.-% activated bulk material of 4/6 rubber particles, 1/6 low-melting paraffin from the FT synthesis and 1/6 FT wax (Sasobit®);

FIG. 3 a diagram as a function of time of the flow (measured SABITA BR 4 T, TG1 MB 12) of tire-rubber-modified bitumen produced by stirring at 180° C., 78 wt.-% base bitumen B 80/100, with the variants shown in FIGS. 1 and 2, such as 1) 20 wt.-% rubber particles, 2 wt.-% aromatic oil 2) 19.1 wt.-% rubber particles, 0.9 wt.-% polyoctenamer (Vestenamer®), 2 wt.-% aromatic oil 3) 22 wt.-% of activated bulk material of 9/10 rubber particles, and 1/0 low-melting wax from the Fischer-Tropsch synthesis 4) 22 wt.-% activated bulk material of 9/10 rubber particles and 1/10 mineral oil 5) 22 wt.-% activated bulk material from 4/6 rubber particles, 1/6 mineral oil and 1/6 FT wax with freezing point 102° C. (Sasobit®)

22 wt.-% activated bulk material of 4/6 Rubber particles, 1/6 low melting paraffin from the FT synthesis and 1/6 FT wax (Sasobit®).

DETAILED DESCRIPTION OF THE INVENTION

Best Mode for Carrying Out the Invention

The following Table 1 documents first the production of an agglomerate according invention, wherein a slightly agglomerated product of 66.6 wt.-% rubber particles (0.2-0.8 mm diameter), 16.7 wt.-% of various swelling agents and 16.7 wt.-% of Fischer-Tropsch paraffin wax with a solidification point of 102° C. are produced in a fluid mixer FM10 at a rotation speed of 3600 RPM:

TABLE 1

| Product | Swelling Agent | Order of Addition | Mixing Time (min) | Maximum Mixing Temperature (° C.) | Product Quality |
|---|---|---|---|---|---|
| 1 | FT Paraffin* | Swelling Agent, FT Wax** | 7:50 | 83 | Pourable, homogenous## |
| 2 | FT Paraffin | Swelling Agent, FT Wax | 5:00 | 120 | Pourable, homogenous |
| 3 | Plant Oil# | Swelling Agent, FT Wax | 4:40 | 86 | Pourable, homogenous |
| 4 | Recycled lubricating oil | Swelling Agent, FT Wax | 5:05 | 86 | Pourable, homogenous |

TABLE 1-continued

| Prod-uct | Swelling Agent | Order of Addition | Mixing Time (min) | Maximum Mixing Temperature (° C.) | Product Quality |
|---|---|---|---|---|---|
| 5 | Recycled lubricating oil | FT Wax, Swelling Agent | 3:45 | 86 | Pourable, homogenous |

*Waksol A (Fischer Tropsch paraffin, melting point 32° C.)
Storflux Nature
**Sasobit ® (Fischer Tropsch paraffin wax, solidification point 102° C.)
The homogeneity of the distribution of the Fischer-Tropsch paraffin wax was examined by determining the wax contents in random samples by DSC.

The rubber granulate is supplied in the mixer, the mixing process and the associated heat generation are started, and thereafter the swelling agent and the wax are measured and added in different sequential orders. Melting of the wax is detected by a sudden increase of the current consumption (gradient measurement) of the mixer at about 85° C., and the mixing process is terminated. The uniformity of the distribution of the wax can be detected in random samples by differential scanning calorimetry.

The example listed in Table 1 shows the conclusiveness, in particular in terms of their repeatability, regarding the features of claims 1 to 10.

The effect of some rubber-swelling agent-paraffin wax-agglomerates described in the following Table 2 on the properties of bitumen by the addition of 12 wt.-% rubber and/or 18 wt.-% of some of the products from the previous Table 1 is then illustrated, wherein a bitumen Nybit E60 having a needle penetration 64 1/10 mm is used:

TABLE 2

| Product | PEN# [1/10 mm] | RuK [° C.]* | Ductility** [mm]l | Elastic Recovery### [%] | Viscosity [mP] |
|---|---|---|---|---|---|
| Rubber | 43 | 59.2 | 173 | 60 | 1380 |
| 1 | 62 | 94.5 | 76 | 54 | 510 |
| 3 | 52 | 87.5 | 90 | 56 | 640 |
| 4 | 46 | 86.5 | 103 | 61 | 650 |

*Ring and Ball softening point (DIN EN 1427)
Needle penetration at 25° C. (DIN EN 1426)
**Ductility at 25° C. (DIN EN 13389)
Elastic recovery at 25° C. (DIN EN 13389)

The agglomerates are mixed with the bitumen at 160° C. by stirring. As a comparison test, the corresponding quantity of pure rubber particles was introduced into the bitumen in the same manner. The higher needle penetration values of the mixtures with the products 1, 3 and 4 compared to the modification with pure rubber show that hardening of the bitumen due to absorption of bitumen components is considerably reduced and almost completely prevented with product 1. Furthermore, the viscosity-lowering effect as compared to the test with pure rubber becomes evident.

A first example for the production and installation of asphalt with inventively produced agglomerates will be explained with reference to Tables 3 and 4, wherein the addition of the agglomerates as a bulk material from bags is selected.

A stone mastic asphalt SMA 16 S is to be manufactured using rubber particles that are activated according to the invention and added directly in the asphalt mixer and installed on a road.

The following activated rubber particles prepared in a fluid mixer are used, which have a particle size of 0.2-0.4 mm before swelling:

TABLE 3

Composition of the used activated rubber particles

| | Rubber Product M | Rubber Product P |
|---|---|---|
| Fraction Rubber Particles [wt,-%] | 66.7 | 66.7 |
| Type of Swelling Agent | Recycled, refined lubricating oil* | Plant oil# |
| Fraction of the Swelling Agent [wt.-%] | 16.65 | 16.65 |
| Fraction of the FT Wax** [wt.-%] | 16.65 | 16.65 |

*Storflux Premium
Storflux Nature
**Sasobit ®

The activated rubber particles are conveyed in a simple manner directly into the asphalt mixer in PE bags with a conveyor belt prior to the addition of the bitumen. The added quantity is 11 kg per ton of asphalt mix, in order to reach 12% rubber fraction based on the bitumen B 50/70.

The asphalt mixture is produced at 170° C.

When applying on the road, the temperature of the asphalt mix in the pavers is 160° C.

The experimentally installed asphalt mix and sample cores from the finished asphalt layer have the following values listed in Table 4:

TABLE 4

Properties of the produced asphalts and the softening points of the extracted binders

| | Rubber product M | Rubber product P |
|---|---|---|
| Minerals passing through a sieve | | |
| 0.063 mm [wt.-%] | 14.1 | 13.5 |
| 0.25 mm [wt.-%]] | 15.5 | 14.5 |
| 0.71 mm [wt.-%] | 17.0 | 16.4 |
| 1.00 mm [wt.-%] | 26.5 | 23.9 |
| 2.00 mm [wt.-%] | 31.9 | 30.1 |
| 5.00 mm [wt.-%] | 43.0 | 40.4 |
| 8.00 mm [wt.-%] | 65.8 | 52.6 |
| 11.20 mm [wt.-%] | 67.4 | 63.0 |
| 16.00 mm [wt.-%] | 98.2 | 98.4 |
| 22.40 mm [wt.-%] | 100.0 | 100.0 |
| Soluble Binder Fraction [wt.-%] | 6.0 | 5.9 |
| Insoluble Rubber Fraction [wt.-%] | 0.6 | 0.6 |
| Binder Fraction total [wt.-%] | 6.6 | 6.5 |
| Softening Point RuK [° C.] | 75.0 | 74.4 |
| Fraction of Interstices MPK* [vol.-%] | 2.8 | 2.2 |
| Fraction of Interstices Core [vol.-%] | 2.6 | 2.5 |
| Elongation Rate at Inflection Point $\epsilon_W 10^{-4}$ ‰//n** | 0.9 | 0.6 |
| Elongation after 10.000 Load Changes** | 9.8 | 8.0 |
| Water Sensitivity Decrease Tensile splitting strength [%] | 15.3 | 8.9 |

*Marshall test samples
**TP Asphalt StB part: uniaxial compression test, 1999

The fraction of the FT wax results in an increased softening RuK (Ring and Ball) in the extracted binders. The tested properties of the asphalts confirm with the experiments that the direct addition of activated and wax-containing rubber particles results in outstanding asphalt properties with high resistance against deformation and low water sensitivity.

The pre-swelling and the thereby attained activation of the rubber improves the production of a conventional rubber-modified bitumen with novel and surprising exhibited properties.

A second example for the production and installation of asphalt with agglomerates according to the invention will be explained with reference to Table 5, wherein the agglomerates are added as bulk material with pneumatic conveying.

A stone mastic asphalt SMA 8 Hmb is to be produced at 170° C. with the rubber product M according to the first example in Table 3 and a bitumen B 50/70.

The activated, waxy rubber particles are conveyed into the asphalt mixer with a pneumatic system before the bitumen is added. Although the pneumatic conveying system is normally used for the addition of cellulose fiber pellets, it can advantageously also be used for the addition of the agglomerates produced according to the invention. Furthermore, when using rubber, no cellulose is required for the production of stone mastic asphalt.

When laying down asphalt test samples, samples may be taken at different locations and tested, which then show the following values listed in Table 5:

TABLE 5

Properties of asphalt samples and the extracted binder at different positions of an experimentally installed asphalt

|  | Sample 1 | Sample 2 | Sample 3 |
|---|---|---|---|
| Minerals passing through a sieve |  |  |  |
| 0.063 mm [wt.-%] | 12.9 | 13.1 | 13.1 |
| 0.126 mm [wt.-%] | 14.8 | 15.1 | 15.1 |
| 2.00 mm [wt.-%] | 32.4 | 32.5 | 32.6 |
| 5.50 mm [wt.-%] | 61.4 | 62.0 | 61.1 |
| 8.00 mm [wt.-%] | 95.8 | 96.1 | 96.8 |
| 11.2 mm [wt.-%] | 100 | 100 | 100 |
| Soluble Binder Fraction [wt.-%] | 6.7 | 6.9 | 6.8 |
| Binder Fraction total [wt.-%] | 7.0 | 7.2 | 7.1 |
| Softening Point RuK [° C.] | 87.5 | 87.5 | 88.4 |
| Fraction of Interstices MPK* [vol.-%] | 2.5 | 2.5 | 2.3 |
| Elastic Recovery** [%] | 60 | 60 | 69 |

*Marshall test samples
**at 25° C. according to DIN EN 13398

It is noteworthy that the softening points and elastic recoveries of the binders extracted from physically separate asphalt samples have values that demonstrate that a homogeneous distribution of the activated rubber particles can be obtained by direct addition into the asphalt mixer, as well as that an asphalt which is uniformly modified with inventive agglomerates and has improved properties can be produced.

Figure 3:
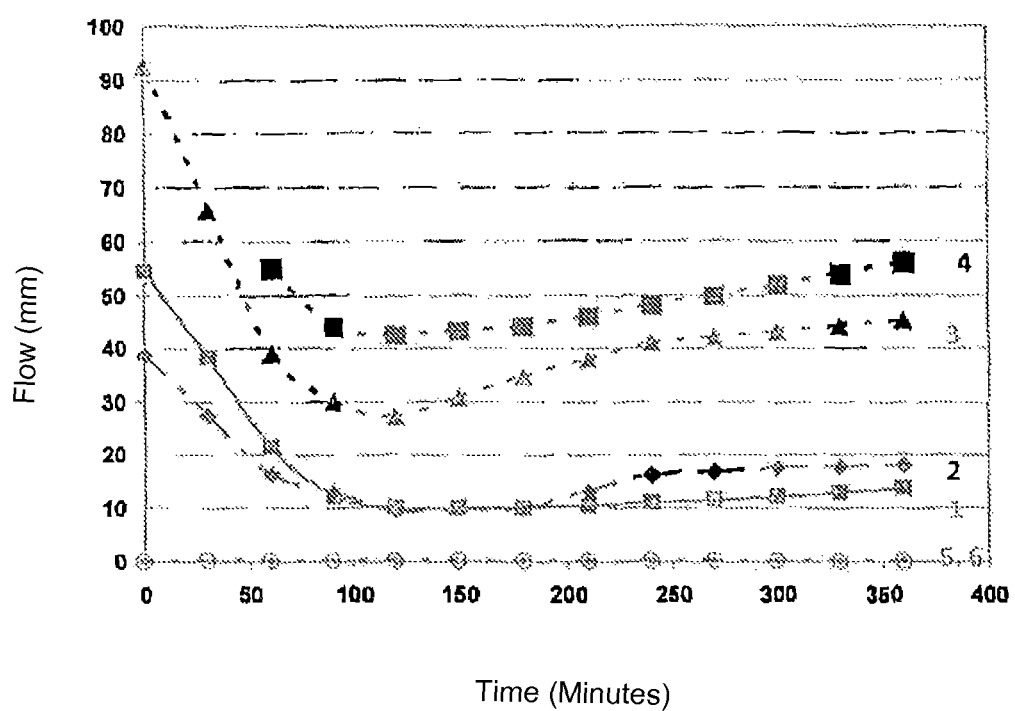

The inventive process is clearly presented with reference to the examples illustrated in FIGS. 1, 2 and 3—starting with the modification step 1) corresponding of the prior art up to the transition to the full effect according to the invention shown in modification steps 5) and 6).

The surprising effects and advantages of the invention for the wet process as compared to ordinary rubber bitumen according to the prior art are illustrated in a diagram showing measurements of important properties. In all experiments, rubber-modified bitumen was prepared from 78 wt.-% bitumen of the penetration grade 80/100 and tire rubber particles as well as other additives and the swollen bulk material activated according to the invention by stirring at 180° C.

FIG. 1 shows the time-dependence of the viscosity of the modified bitumens in a diagram of the modification process. A first modification 1) with 20% tire rubber and 2% aromatic oil corresponds to the prior art. The viscosity of the modified bitumen increases with increasing stirring time due to the swelling of the rubber. After passing through a maximum, the viscosity decreases again due to the partial dissolution of the rubber. To obtain the desired properties with regard to the stability against deformation and elasticity of the produced asphalt, only a portion of the rubber is to be dissolved. The rubber-modified bitumen can therefore be used for the production of asphalt only within a short time window, which is located around the maximum of the viscosity. When delays are encountered due to problems in the supply chain and an excessive dissolution of the rubber occurs, the binder can no longer be used. The binder must then be returned in the modification plant for reprocessing. This represents a significant economic loss for the binder manufacturer and other economic losses due to the delay in applying the asphalt to the road.

According to a second modification 2), a portion of the rubber was replaced by polyoctenamer. This slightly changes the course of the viscosity curve, but the viscosity remains at the same high level.

According to a third modification 3), the bitumen was modified with activated swollen bulk material composed of 9/10 rubber particles and 1/10 low-melting wax from the Fischer-Tropsch synthesis. This bulk material and the other three bulk materials were prepared in a heat-generating fluid mixer. The obtained modified bitumen had already a significantly reduced viscosity.

A fourth modification 4) was carried out in analogy to 3). However, the bulk material was produced from 9/10 rubber particles and 1/10 mineral oil. This further reduces the viscosity of the modified bitumen.

The fifth and sixth modifications 5) and 6) were carried out in analogy to 3). However, the inventive bulk material was produced from 4/6 rubber particles, 1/6 FT wax (solidification point 102° C., Sasobit®) and 1/6 swelling agent, i.e. mineral oil in 5), as well as low-melting paraffin produced from the Fischer-Tropsch synthesis in 6).

These inventively modified bitumens 5) and 6) have the lowest viscosities and thus the greatest advantages with respect to the intentional compaction of asphalt mix prepared therefrom and the greatest potential for reducing the temperature in the production and installation of asphalt. This advantageously reduces energy consumption and emissions (vapors and aerosols from bitumen). The viscosity is at least halved compared to the prior art.

It has also been surprisingly observed in the modification 5) and 6) with the activated swollen bulk materials that an essentially constant viscosity was reached after a stirring time of about 100 minutes. A constant viscosity represents significant processing and logistical advantages for the further use of the modified bitumen, since the time window with a constant viscosity, i.e. the required ratio of swelling and only slight dilution of the rubber, is increased many times over. The modified bitumen can then be used the production of asphalt over a much longer time period. This simplifies the logistics and the desired properties of the modified binder can be achieved more reliably, while significantly reducing the risk of having to return and rework batches that have become unusable due to excessive dissolution of the rubber.

FIG. 2 shows the effects of the modifications on the ring and ball softening point of the bitumen. A high softening point represents a good deformation resistance and stability at high temperatures in the summer. Compared to the rubber modification according to the above 1), i.e. the prior art, the use of rubber particles activated only with the swelling agent in the modifications 3) and 4) disadvantageously reduces the softening point. Conversely, the use of activated bulk materials produced with swelling agents and wax in the modifications 5) and 6) advantageously caused a strong increase of the softening point.

FIG. 3 shows the effects of the modifications on the flow properties of the bitumen. In the test method Sabita BR 4 T, rubber-modified bitumen are supported on a metal plate inclined at 35° at 60° C. The flow path is measured after 4 hours. Compared to the conventional rubber modification according to the above 1), the use of rubber particles activated only with the swelling agent enlarged the flow path. This correlates with the reduced viscosity. Modification of the bulk material activated with swelling agent and wax produced according to the present invention in the modifications such as 5) and 6) completely prevented flow. This is especially remarkable because the viscosity is at the same time at least halved in the temperature range where the modified bitumen is processed and applied.

These explanations also provide evidence that the invention is a uniform process, starting with the process for producing a bulk material of agglomerates that include rubber particles and wax, via the composition of the agglomerate produced according to the process, until the use of this bulk material for the production of asphalt or bituminous materials with improved properties.

The aforedescribed invention satisfies the intended goal on the final product, such as asphalt or bituminous materials, as a result of the provided method for the preparation of a bulk material of agglomerates, the provided intermediate product of the composition of the agglomerate produced in accordance with the process and the use of this bulk material for the production of asphalt or bituminous materials with improved properties. The essential and newly combined structural element "rubber particles and wax" with its surprising novel properties and effects represents an innovative and close technical and functional context up to the final product.

INDUSTRIAL APPLICATIONS

Compared to the conventional, initially analyzed solutions, such as disclosed in EP 1 873 212 B1, according to which the modification of rubber powder takes place by swelling with 2-40% of aromatic oils and subsequent modification of bitumen in the wet process and the pre-swelling reduces the temperature and the mixing time in the modification of the bitumen;

WO/1997/026299 and DE 196 01 285 A1, wherein free-flowing granulate made of 50-95% rubber and bitumen or polymer plastic (thermoplastic elastomers or plastomers) is described, whose components uniformly distribute at temperatures >130° C. when exposed shear forces, wherein up to 25% additives may be included (sulfur, vulcanization accelerators, heavy oil, fatty acids, cellulose fibers), and the granulate are produced from a material that is homogenized/chemically combined in a kneader at high temperatures or may be produced by pressing the individual components at a low temperature (edge mill, perforated disk), to produce a rubber asphalt mixture for road pavements by addition of the granulate in an asphalt mixing process to the minerals or bitumen;

US 2008/0216712 A1 for the preparation of hydrated lime pellets for use in the production of asphalt, and/or soil conditioning by pelleting the hydrated lime with a binder (0.5 to 69%), wherein the hydrated lime is used to improve the water resistance of asphalt. Method for the preparation of hydrated lime pellets for use in the production of asphalt and/or soil conditioning. Pelleting of the hydrated lime with a binder (0.5 to 69%), wherein the hydrated lime is used to improve the water resistance of asphalt and the adhesion of the binder on the minerals, as well. Rubber and wax can in this application function as a binder, the binder can be water-based or hydrophobic, and may contain at least one of the components, such as bitumen, plastomers, elastomers, rubber, ground tire rubber, pre-reacted ground tire rubber, the pellet may contain up to 30% of an additive (aliphatic crude oil distillate, plastomers, elastomers, rubber, pre-reacted tire rubber) and may further include as an additional component of rheology modifiers, structural additives, solvents, dyes, furthermore oils and waxes are mentioned as organic binders for the pellet, and the pellet may consist of a core of hydrated lime and a shell of the binder, and the shell may consist of bitumen and high temperature waxes;

WO 94/14896/CA 2152774 for the preparation of a bituminous composition, wherein rubber particles from scrap tires are swollen by heating and shearing in a highly aromatic hydrocarbon oil and at least partially depolymerized, and this material is dispersed in bitumen and a compatibilizer (liquid rubber), and, if necessary, a crosslinking agent may be added for obtaining a storage-stable binder, whereafter a master batch with 25-80% dispersed, stabilized rubber is formed in bitumen with fillers and polymers into a pellet;

DE 601 21 318 T2 for the preparation of a granular rubber material and its use in bitumen with rubber granules, for example from scrap tires, and a thermal adhesive (polyolefins, e.g. PE, PP, EVA) with optional addition of fibers in an extrusion process, wherein the heat of 80-300° C. generated through friction melts the thermoplastic adhesive;

DE 44 30 819 C1, wherein rubber and activated carbon are added for producing bituminous mixtures, in particular road asphalt, and the activated carbon reduces vapor/gaseous emissions produced during the production of hot asphalt and the elution of hazardous substances through water in cold asphalt produced with tar-containing recycled asphalt, and wherein the rubber is added to the hot minerals before the bitumen, either together with or separately from the activated carbon, or previously mixed with the bitumen;

CH 694 430 A5 with a mastic asphalt with the addition of rubber granulate, preferably from scrap tires, wherein the lower density of the rubber granulate compared to mastic asphalt leads to an accumulation on the surface of the asphalt layer, with the goal to make the surface more elastic, to reduce noise, improve the anti-slip properties of the mastic asphalt;

the invention provides the advantages that
the swollen pellets introduce an additional wax component which reduces the viscosity (advantages for processing, reliable compaction, energy savings, reduction of emissions) and increase the resistance of the asphalt against deformation at ambient temperature, the rubber particles are activated by swelling and the properties of the asphalt are improved through intense Interaction with the bitumen, the swelling prior to agglomeration prevents removal of oily constituents from the bitumen when the rubber in the asphalt swells, causing hardening of the bitumen, the optional polyoctenamer enhances the compatibility of rubber and bitumen by chemical crosslinking, no aromatic oils harmful to health/environment are used; instead, safe naphthenic mineral oils, paraffinic mineral oils, recycled lubricating oils, paraffins from the Fischer-Tropsch synthesis or renewable natural oils are used, and the product according to the invention is available in agglomerated form which can be easily and safely (dust explosions) stored, transported and dispensed with systems usually present in asphalt mixing plants (pneumatic transport, screw conveyor), so that it is suitable for the direct addition into the asphalt mixer and reduces the costs (time, energy, investment for modification plant) for the prior art bitumen modification, so that a wide commercial use can be envisioned.

The invention claimed is:

1. A process for preparing bulk material of agglomerates, comprising the steps of:
   a) activating rubber particles by applying a swelling agent which causes the rubber particles to swell,
   b) adding a melt of viscosity-reducing wax to the activated rubber particles of step a), and
   c) agglomerating the activated rubber particles and the viscosity-reducing wax by adding adhesion-enhancing materials by mixing,
   wherein the agglomerates have waxes with a solidification point above 50° C., and are selected from a group consisting of crude oil paraffins, Fischer-Tropsch paraffins, amide waxes, montan waxes, polymer waxes, and esters of glycerol.

2. The process according to claim 1, wherein the swelling agent is one of naphthenic or paraffinic mineral oils, recycled lubricating oils, natural oils or low-melting paraffins from Fischer-Tropsch synthesis.

3. The process according to claim 1, wherein the melt from viscosity-reducing wax contains polyoctenamer.

4. The process according to claim 1, wherein the bulk material is asphalt.

5. The process according to claim 1, wherein the added adhesion-enhancing materials is resins or polyisobutenes.

6. The process according to claim 1, wherein the rubber particles are obtained at ambient temperature and derived from mechanically generated screen fractions.

7. The process according to claim 1, wherein the rubber particles are obtained cryogenically from mechanically generated screen fractions.

8. The process according to claim 1, wherein the rubber particles are a mixture of pure, rubber particles, obtained both at ambient temperature and cryogenically, from mechanically generated screen fractions.

9. The process according to claim 1, wherein the added viscosity-reducing wax forms a layer on the rubber particles activated by swelling.

10. The process according to claim 9, wherein the added wax melt amounts to a fraction of 1-50 wt.-% relative to a fraction of the rubber particles.

11. The process according to claim 10, wherein the added wax melt amounts to a fraction of 25-35 wt.-% relative to as fraction of the rubber particles.

12. The process according to claim 1, wherein the wax melt comprises polyoctenamer with a fraction of 1-50 wt.-% in the wax melt.

13. The process according to claim 12, wherein the wax melt comprises polyoctenamer with a fraction of 25-35 wt.-% in the wax melt.

14. The process according to claim 1, wherein the added adhesion-enhancing materials is 0.1-5 wt. % for intensifying agglomeration.

15. The process according to claim 1, further comprising the step of adding bituminous materials in an asphalt mixing plant.

16. The process according to claim 1, further comprising the step of forming a pellet from the agglomerates using: (i) a heated mechanical mixer; (ii) an extrusion with an edge mill and a shaping die; (iii) an extrusion; or (iv) a heat-generating mixer embodied as a friction mixer, a fluid mixer or a turbo mixer.

17. The process according to claim 16, wherein the rubber particles are added to the wax, and the agglomerates are formed in two successive process steps.

18. The process according to claim 1, further comprising the steps of:
   providing penetration of the swelling agent into interstices of the rubber particles by mixing,
   urging the rubber particles apart due to mixing,
   reducing physical forces of attraction and viscosity of the mixture in relation to its initial physical forces of attraction and viscosity, and
   wherein during the reduction in the viscosity effective during this process an increased stability of mutual crosslinking of the rubber particles after incorporation of the agglomerates and a continuous stability lasting up to 180 minutes is obtained.

19. The process according to claim 18, further comprising the step of reducing temperatures in preparation and application of the mixture by adding the agglomerates directly to the mixture with a fraction of 1-30 wt.-% relative to a fraction of bitumen before, either during or after addition of the bitumen.

20. The process according to claim 19, wherein the direct addition of the agglomerates with a fraction of 5-30 wt.-% is provided.

21. A process for preparing bulk material of agglomerates, comprising the steps of:
   a) activating rubber particles by applying a swelling agent which causes the rubber particles to swell,
   b) adding a melt of viscosity-reducing wax to the activated rubber particles of step a),
   c) agglomerating the activated rubber particles and the viscosity-reducing wax by adding adhesion-enhancing materials by mixing,
   wherein the wax melt is added within about 2-3 minutes of activation of the rubber particles by swelling.

22. A process for preparing bulk material of agglomerates, comprising the steps of:
   a) activating rubber particles by applying a swelling agent which causes the rubber particles to swell,
   b) adding a melt of viscosity-reducing wax to the activated rubber particles of step a),
   c) agglomerating the activated rubber particles and the viscosity-reducing wax by adding adhesion-enhancing materials by mixing,
   forming a pellet from the agglomerates using: (i) a heated mechanical mixer; (ii) an extrusion with an edge mill and a shaping die; (iii) an extrusion; or (iv) a heat-generating mixer embodied as a friction mixer, a fluid mixer or a turbo mixer, wherein the formed pellet comprises
(i) the rubber particles having a particle size distribution of between 0.05 and 5 mm,
(ii) the melt of wax coating the rubber particles with a fraction of 1-50 wt.-% relative to a fraction of the rubber particles, and
(iii) the swelling agent absorbed in the rubber particles in a range of 1% and 100% of a maximum absorbable quantity of the swelling agent.

23. A process for preparing bulk material of agglomerates, comprising the steps of:
   a) activating rubber particles by applying a swelling anent which causes the rubber particles to swell,
   b) adding a melt of viscosity-reducing wax to the activated rubber particles of step a),
   c) agglomerating the activated rubber particles and the viscosity-reducing wax by adding adhesion-enhancing materials by mixing,
   d) providing penetration of the swelling agent into interstices of the rubber particles by mixing,
   e) urging the rubber particles apart due to mixing,
   f) reducing physical forces of attraction and viscosity of the mixture in relation to its initial physical forces of attraction and viscosity, and
   wherein during the reduction in the viscosity effective during this process an increased stability of mutual cross-linking of the rubber particles after incorporation of the agglomerates and a continuous stability lasting up to 180 minutes is obtained,
   g) reducing temperatures in preparation and application of the mixture by adding the agglomerates directly to the mixture with a fraction of 1-30 wt.-% relative to a fraction of bitumen before, either during or after addition of the bitumen,
   wherein
   (i) the addition of the agglomerates is carried out 3 to 15 seconds prior to the addition of the bitumen,
   (ii) the agglomerates are rapidly disintegrated and the rubber particles are pre-dispensed within this period; and due to increased temperature and increased shear forces, thermal activation of the rubber particles occurs,
   (iii) the increased temperature liquefies the wax in the mixing process and rapidly releases the activated rubber particles,
   (iv) the rubber particles activated by pre-swelling produce a more intense interaction with the bitumen, and
   (v) the mixing temperature is adjusted in a range of 130 to 190° C.

24. The process according to claim 23, wherein the more intense interaction is encapsulation by the bitumen.

25. A process for preparing bulk material of agglomerates, comprising the steps of:
   a) activating rubber particles by applying a swelling agent which causes the rubber particles to swell,
   b) adding a melt of viscosity-reducing wax to the activated rubber particles of step a),
   c) agglomerating the activated rubber particles and the viscosity-reducing wax by adding adhesion-enhancing materials by mixing,
   d) providing penetration of the swelling agent into interstices of the rubber particles by mixing,
   e) urging the rubber particles apart due to mixing,
   f) reducing physical forces of attraction and viscosity of the mixture in relation to its initial physical forces of attraction and viscosity, and
   wherein during the reduction in the viscosity effective during this process an increased stability of mutual cross-linking of the rubber particles after incorporation of the agglomerates and a continuous stability lasting up to 180 minutes is obtained,
   g) reducing temperatures in preparation and application of the mixture by adding the agglomerates directly to the mixture with a fraction of 1-30 wt.-% relative to a fraction of bitumen before, either during or after addition of the bitumen,
   wherein
   (i) the application of the mixture is at a temperature of 120 to 230° C.,
   (ii) the mixture has a degree of compaction in a range of 90 to 103%,
   (iii) the mixture has a splitting tensile strength in a range of 1.70 to 3.00 N/mm$^2$,
   (iv) the mixture has a splitting tensile strength after storage in water in a range of 1.50 to 2.50 N/mm$^2$, and
   (v) the mixture has a resistance against deformations, measured as an elongation rate in a uniaxial pressure threshold test in a range of 0.6 to $0.9*10^{-4}$/n‰.

26. The process according to claim 25, wherein the reduction in the viscosity of the bituminous material in relation to its initial viscosity is accomplished due to cooperation of the swelling agent and the wax, with a stability of the reduction of the viscosity in the mixture lasting for up to 180 min and an increased stability of the cross-linking of the rubber particles, as well as stability of the mixture with bituminous or asphalt.

27. A process for preparing bulk material of agglomerates, comprising the steps of:
   a) activating rubber particles by applying a swelling agent which causes the rubber particles to swell,
   b) adding a melt of viscosity-reducing wax to the activated rubber particles of step a),
   c) agglomerating the activated rubber articles and the viscosity-reducing wax by adding adhesion-enhancing materials by mixing, and
   d) spraying the agglomerates with bituminous materials and applying minerals to a surface of a traffic mute.

* * * * *